United States Patent [19]

Orain

[11] Patent Number: 4,623,321
[45] Date of Patent: Nov. 18, 1986

[54] UNIVERSAL COUPLING FOR TRANSMITTING A MOVEMENT OF ROTATION AND A TORQUE BETWEEN TWO SHAFTS OPERATING AT A LARGE ANGLE

[75] Inventor: Michel A. Orain, Conflans Sainte Honorine, France

[73] Assignee: Glaenzer Spicer, Poissy, France

[21] Appl. No.: 666,378

[22] Filed: Oct. 30, 1984

[30] Foreign Application Priority Data

Nov. 8, 1983 [FR] France .................. 83 17737

[51] Int. Cl.⁴ .................. F16D 3/10; F16D 3/50
[52] U.S. Cl. .................. 464/7; 464/87; 464/91; 464/147
[58] Field of Search .................. 464/7, 24, 28, 79, 80, 464/87, 88, 89, 91, 92, 96, 106, 147, 150, 173, 904

[56] References Cited

U.S. PATENT DOCUMENTS

| | | | |
|---|---|---|---|
| 1,414,411 | 5/1922 | Herreshoff et al. | 464/80 |
| 1,445,272 | 2/1923 | Gill | 464/7 |
| 2,693,222 | 11/1954 | Krupp | 464/88 X |
| 2,747,386 | 5/1956 | Ayling | 464/28 |
| 2,929,231 | 3/1960 | Bank | 464/28 |
| 3,342,530 | 9/1967 | Krekeler | 464/28 X |
| 3,926,074 | 12/1975 | Sugahara | 464/28 X |
| 3,955,377 | 5/1976 | Bendall | 464/7 X |

FOREIGN PATENT DOCUMENTS

| | | | |
|---|---|---|---|
| 2318612 | 11/1974 | Fed. Rep. of Germany . | |
| 2609911 | 9/1977 | Fed. Rep. of Germany | 464/28 |
| 364764 | 8/1906 | France | 464/79 |
| 2097833 | 3/1972 | France . | |
| 841793 | 7/1960 | United Kingdom | 464/79 |
| 616465 | 7/1978 | U.S.S.R. | 464/28 |

Primary Examiner—Stuart S. Levy
Assistant Examiner—Daniel P. Stodola
Attorney, Agent, or Firm—Wenderoth, Lind & Ponack

[57] ABSTRACT

A coupling is adapted to transmit a movement of rotation and torque between two shafts which make therebetween an angle of between 0° and 90° which is fixed or variable. The coupling includes a flexible or elastic wall having, when it is mounted in the coupling, an active part constituted by two spherical segments one of which segments is outside the other, and which are interconnected by a movable trough or bend. The spherical segments are extended by end parts which are provided with heel portions for fixing the wall to cups rigid with the shafts. This coupling permits the transmission through the flexible wall of moderate torque at large angles between the shafts and with practically no resistance to the positioning of the shafts at an angle to each other.

13 Claims, 7 Drawing Figures

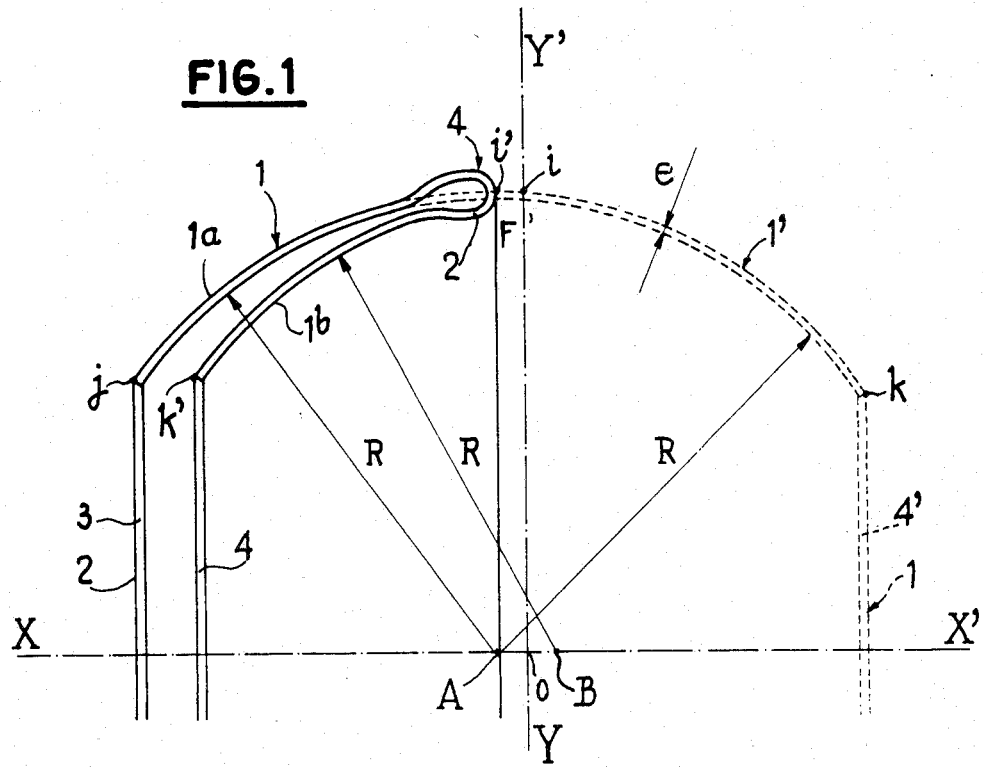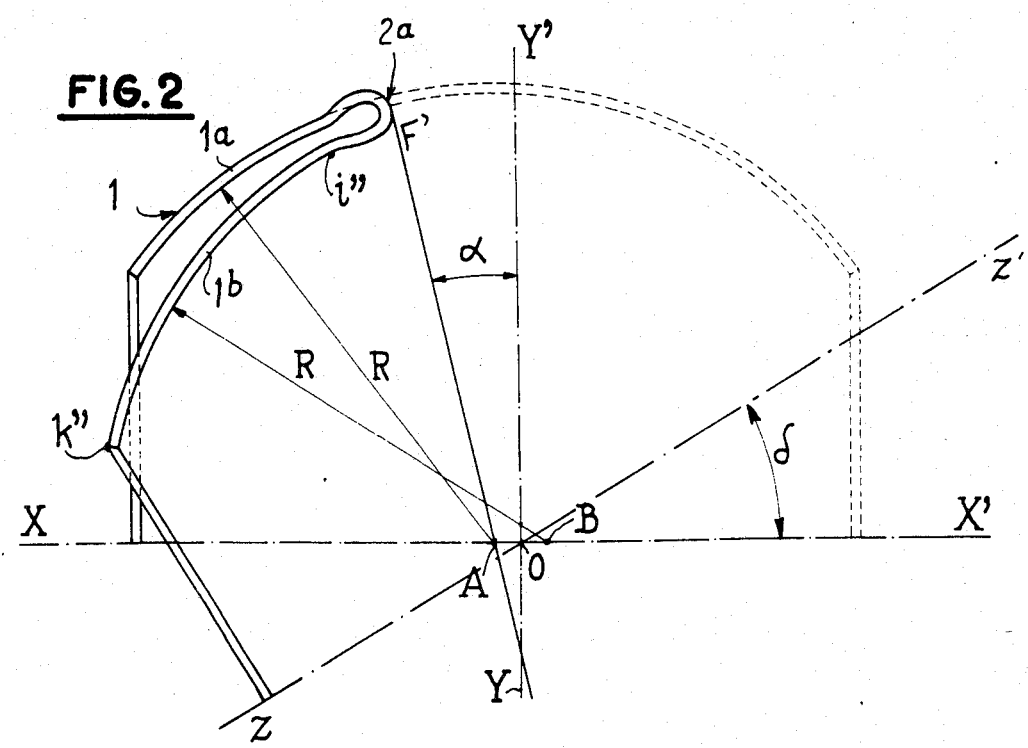

UNIVERSAL COUPLING FOR TRANSMITTING A MOVEMENT OF ROTATION AND A TORQUE BETWEEN TWO SHAFTS OPERATING AT A LARGE ANGLE

SUMMARY OF THE INVENTION

The present invention relates to a universal coupling for transmitting a movement of rotation and a torque between two shafts which define therebetween either a fixed angle between 0° and 90°, or a variable angle which may vary from 0° to 30° or 90° according to the arrangements.

The flexible material employed may also be elastic and may thus be formed for example by a suitable plastic material, an elastomer or a rubber.

Many elastically yieldable coupling constructions are known, but they only allow operating angles of low values, usually less than 10°. Further, these couplings have a high stiffness or resistance to angular operation of the shafts which often constitutes a major drawback. In particular, the German patent application No. 26 09911 discloses a coupling having a flexible wall which includes bends. But this wall does not allow the angular operation of two shafts owing to the high shear stress it produces in the regions of this wall located in a plane perpendicular to the plane containing the shafts. This shear stress results in not only a redhibitory reaction moment to the angular positioning of the shafts, but also a rapid deterioration of the active elastic wall and an intense heating of the latter by hysteresis during the rotation of the coupling which renders the latter useless industrially.

An object of the invention is to provide a universal coupling which is capable of transmitting moderate force compared to certain known couplings, but which allows large operating angles between the shafts.

According to the invention, the coupling comprises a flexible wall having a spherical region and means for fixing the wall to the shafts, said spherical region forming, when the flexible wall is mounted between the shafts, an active or force transmitting part constituted by two substantially coaxial spherical segments, one of which is outside the other and which are connected by a curved movable bend or vault produced by a turning back of said spherical wall.

Such a coupling has many advantages:
1. Large allowable angularity of the shafts.
2. Practically complete absence of resistance to the creation of an angle between the shafts.
3. Simplicity of construction.
4. Lightness.
5. Very low cost.
6. Radial damping in addition to torsional damping.
7. Perfect homokinetic operation.

According to one embodiment of the invention, the spherical region forming the active part is extended by two annular end parts, each of which has an opening centered on the axis of the corresponding shaft, said end parts being provided with means for fixing them to cups connected to the two shafts, for example projecting heel portions capable of being fitted in conjugate recesses formed in the cups, said cups having spherical surfaces for supporting and guiding the corresponding spherical segments of the flexible wall, and the volume between the spherical segments being filled with a lubricant.

BRIEF DESCRIPTION OF THE DRAWINGS

Other features and advantages of the invention will be apparent from the following description, with reference to the accompanying drawings which illustrate several non-limiting embodiments:

FIG. 1 is a diagram showing the principle of operation of a coupling according to the invention, comprising a flexible wall having a spherical active part;

FIG. 2 is a diagram similar to FIG. 1, illustrating a different angular position of the inner spherical segment of the flexible wall;

DETAILED DESCRIPTION OF THE INVENTION

Figure 3:
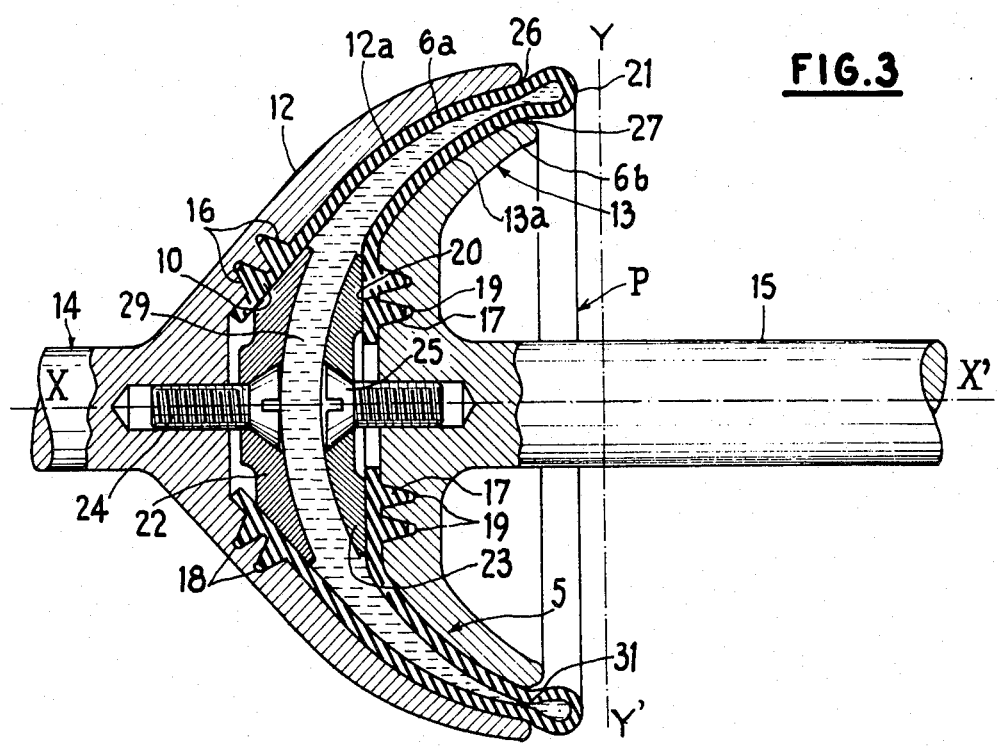
FIG. 3 is a half-elevational half-sectional and view of a first embodiment of the universal coupling according to the invention, the two shafts being in alignment or coaxial.

With reference to FIG. 1, there is shown a flexible, optionally elastic, wall 1, made for example from a suitable plastics material, an elastomer, or rubber, etc., having a thickness e. The wall 1, which is coaxial about an axis X—X', has a spherical region constituting its active part, i.e. portion undergoing bending during use, and is formed by two spherical segments 1a, 1b, which are substantially coaxial, one segment 1a being outside the other, 1b, these segments being connected by a curved movable bend or vault 2 forming a loop.

The two spherical segments 1a, 1b are respectively interrupted by circular openings 3, 4 coaxial with axis X—X' on which are located the centers of curvature A and B respectively of the spherical segments 1a and 1b, A and B being in the vicinity of or adjacent each other. Each spherical region 1a, 1b has a radius of curvature R, the inner spherical region 1b being capable of unrolling on each side of an axis Y—Y' perpendicular to the axis X—X' and intersecting the latter between the points A and B. At the end of the unrolling of the spherical segment 1b beyond the axis Y—Y', the wall 1 has the shape 1' illustrated in dotted lines in the right part of FIG. 1, in which the vault or bend 2 is eliminated and the opening 4 is shifted to 4'.

The spherical flexible wall, such as shown at 1', with its two coaxial openings 3, 4', is obtained in this shape by moulding. If the part of the wall located on the right side of the axis Y—Y' is turned back to the interior of the bellows constituted by this wall, by shifting the opening 4' toward the opening 3, the point k defining the opening 4' assumes the position k' when the part of the turned-back wall occupies the position 1b, while the homologous point j defining the opening 3 remains fixed in position. During the displacement of the turned-back spherical part toward its position 1b, a vault or bend is formed between this turned-back part and the spherical region 1a, the intersection i of the axis Y—Y' with the wall 1' moving to the position i' which constitutes the top or axial end of the vault or bend 2 connecting the segments 1a and 1b. The inner segment i', k' is centered at B and has an inside spherical radius substantially equal to R.

The natural flexion axis of the wall 1 is perpendicular to the plane of FIGS. 1 and 2 and passes through the center O of articulation of the coupling, such center O being located at the intersection of the two axes X—X' and Y—Y'. This natural flexion axis also passes in the vicinity of a plane F'A tangent to the vault or bend 2. That is, when one spherical segment moves relative to the other spherical segment, the vault or bend 2 carries out a movement about such natural flexion axis. Consequently, the flexible wall 1 may operate under the best conditions for transmitting a torque during the rotation of the shafts at an angle.

The distance A, B may vary in accordance with needs but it is advantageously reduced to a minimum and is sufficient to avoid friction between the outer wall 1a and inner wall 1b.

Figure 5:
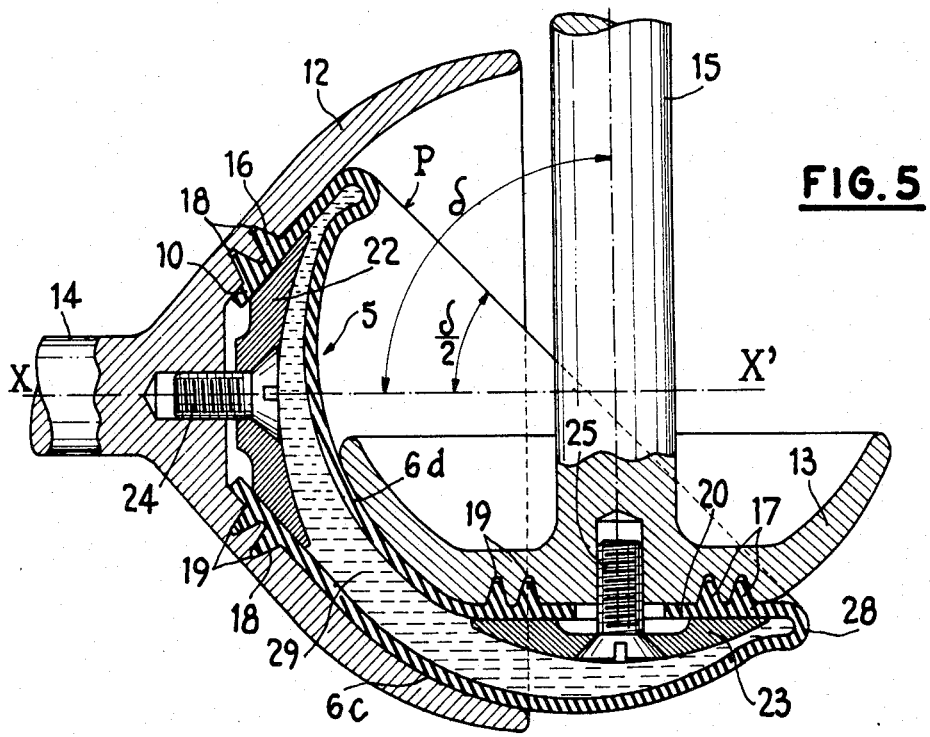
FIG. 5 is a view similar to FIG. 3 of the shape of the flexible wall after one of the shafts has turned through 90°.

If the axis X—X' is tilted through an angle $\delta$ (FIG. 2), so that this axis assumes the position Z—Z', the vault or bend 2 moves to the position 2a and tilts through an angle $\alpha$ substantially equal to $\delta/2$, the point i' assuming the position i'' and the point k' the position k''. If the flexible or elastic wall 1 is made from a sufficiently strong material, it is capable of constituting the active or force transmitting part of the coupling according to the invention, a first industrial embodiment of which is shown in FIGS. 3 to 5.

Figure 4:
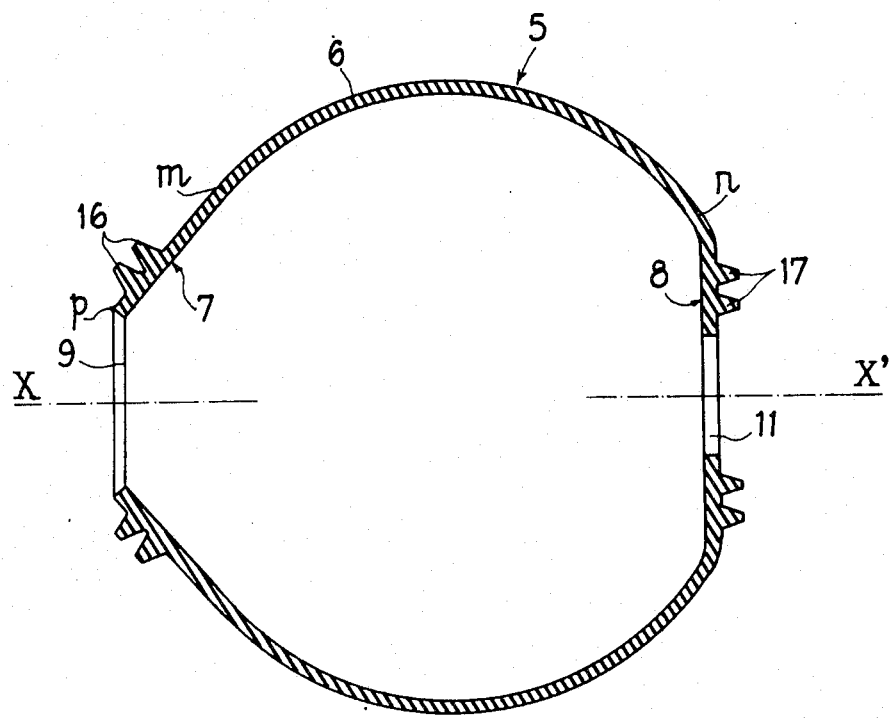
FIG. 4 is an axial sectional view of the flexible wall of the coupling shown in FIG. 3, at it is shaped after moulding and before being mounted between the shafts to be coupled.

The flexible wall 5 of this embodiment is moulded as shown in FIG. 4. It has a single spherical region 6 with a single center and extending on an arc mn, and two annular end parts 7, 8 each of which is provided with an opening 9, 11 centered on the axis of revolution X—X'. The end parts 7, 8 are provided with means for fixing them to cups 12, 13 respectively connected to the shafts 14 and 15 to be coupled (FIG. 3). In the described embodiment, these fixing means are formed by heel portions 16, 17, two heel portions being provided on each end part 7, 8 and projecting from these end parts 7, 8 and from the spherical region 6. These heel portions 16, 17 are adapted to fit in recesses formed by conjugate trapezoidal grooves of annular shape 18, 19 formed in the cups 12, 13 in coaxial relation to the respective shafts 14, 15.

The cups 12, 13 have spherical surfaces 12a, 13a, for supporting and guiding the corresponding spherical segments 6a, 6b of the flexible wall 6 when the latter is mounted on the coupling, the spherical segments 6a, 6b being connected by a vault or bend 21.

The fixing of the flexible wall 5 to the cups 12, 13 is completed with respect to each end part 7, 8, by a washer 22, 23 which is coaxial with the corresponding shaft 14, 15, these washers 22, 23 being maintained in bearing relation to the end parts 7, 8 by screws 24, 25 inserted in the respective shafts 14 and 15 coaxially of the latter.

The screws 24 and 25 may of course be replaced by any other like fixing means.

The connecting vault or bend 21 is free when the coupling shafts are in alignment, as illustrated in FIG. 3.

The cups 12, 13 have, along their edges facing the flexible wall 5, rounded portions 26, 27 so as to avoid damage to the wall 5.

When this coupling operates at an angle $\delta = 90°$ after a pivoting of the shaft 15 through this angle $\delta$ (FIG. 5), the plane P tangent to the vault or bend 21 has correspondingly pivoted with respect to the axis X—X' of the shaft 14 through an angle substantially equal to $\delta/2 = 45°$, while the upper part of the spherical segment 6a has shortened and almost disappeared and on the opposite side of the axis X—X' this spherical segment has lengthened to the same extent and assumes the conformation 6c. Inversely, the inner spherical segment 6b has lengthened, on one side, (segment 6d in FIG. 5), while its part adjacent to the segment 6c, to which it is connected by the vault or bend shortened and 28, practically disappeared.

The volume 29 between the spherical segments 6a, 6b and the washers 22, 23 may be advantageously filled with a lubricant.

The presence of this lubricant eliminates any possibility of abrasion between the regions of the flexible segments 6a, 6b which might come into contact with each other, for example at 31 at the base of vault or bend 21.

As mentioned before, this coupling allows a large angularity between the shafts which may reach 90°, either with a fixed angle or a variable angle, the material of the flexible wall or elastic wall 5 being suitably chosen so as to have the required strength for transmitting moderate torques.

Further, the bellows formed by the flexible wall 5 imparts to the coupling a practically complete absence of resistance to the creation of an angle between the shafts, simplifies its construction and renders it lighter by rendering it very light relative to known prior constructions, and at considerably reduced cost.

A mechanical radial centering is superfluous, since this centering is ensured by the active wall of the coupling.

Figure 6:
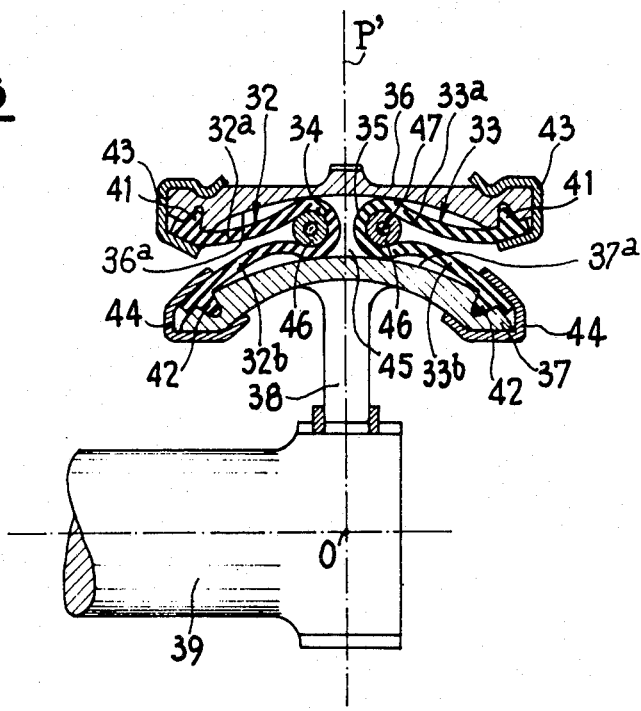
FIG. 6 is an axial half-sectional and half-elevational view of a second embodiment of the coupling according to the invention.

In the modification shown in FIG. 6, the coupling comprises a pair of flexible walls 32, 33 which are disposed symmetrically relative to a median plane P' so that their centers of articulation coincide at O. Each of the walls 32, 33 has two cylindrical segments 32a, 32b and 33a, 33b connected by a vault or bend 34, 35 and respectively secured to inner rings 36 and 37. The ring 37 is connected to a rod 38 fixed to a shaft 39 so as to be perpendicular to the latter, the ring 36 being secured in a similar manner to a shaft (not shown). As concerns the flexible walls 32, 33, the rings 36, 37 have respective spherical regions 36a, 37a.

The edge portions of the spherical segments 32a, 32b; 33a, 33b are provided with projecting heel portions 41, 42 which are respectively fitted in the rings 36, 37 and maintained embedded in the latter by clamping collars 43, 44 which are formed over and around the rings 36, 37.

The space 45 inside the walls 32, 33 and the rings 36, 37 may be advantageously filled with a lubricant. The vaults or bends 34, 35 may be supported by means of inner barrel-shaped rollers 46, each of which has extending therethrough a metal wire 47 with which they constitute a collar for providing an effective radial guiding between the inner ring 37 and outer ring 36 of the coupling.

Indeed, during the operation of the coupling at an angle between the shafts, the elastic walls 32, 33 are interposed between the rollers 46 and the spherical regions 36a, 37a, so that the rollers 46 provide a flexible damped radial guiding without adversely affecting the angular mobility of the coupling. In this embodiment, the transmissible torque is obviously double the torque transmitted by the construction having a single active wall.

Figure 7:
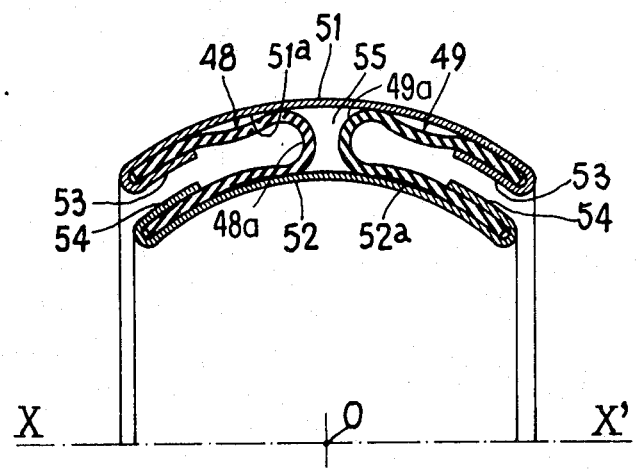
FIG. 7 is an axial sectional view of a third embodiment of the coupling according to the invention.

The modification shown in FIG. 7 is a simplified construction comprising two flexible or elastic walls 48, 49 which are fixed in a sealed manner to the corresponding spherical rings 51, 52 by a forming over of the edge portions 53, 54 of the rings 51, 52 onto the flexible walls 48, 49. When the coupling operates with the shafts in alignment, the centers of articulation of the walls 48, 49 and the natural flexion centers of the two bends 48a, 49a coincide with the center O of the coupling on the axis X—X' of revolution of the walls 48, 49 and the rings 51, 52. The space 55 between the walls 48, 49 and the rings 51, 52 is filled with a lubricant which performs a damping function for the radial displacements in addition to lubrication of the contact of the elastic walls 48, 49 with the spherical surfaces 51a, 52a of the rings 51, 52.

The fact that the natural flexion centers of the bending of the bends 48a, 49a be coincident with the center O ensures a complete freedom of the creation of an angle between the shafts without resulting in shear stress in the elastic wall owing to this creation of an angle. Further, no opposing moment is developed with regard to the creation of the angle, and no alternating shear stress is created when the coupling rotates at an angle in use.

The invention is not limited to the described embodiments and includes modifications of construction. Thus, other known means may be employed for fixing the flexible or elastic walls to the coupling rings. This fixing may indeed be achieved by a bonding or vulcanization or by mechanical assemblies employing cones. Likewise, the elastic wall may be internally reinforced by a fabric comprising different types of known fibers.

What is claimed is:

1. A universal coupling for transmitting rotation and torque between two shafts, each said shaft having an axis of rotation, with said axes having an angle of 0° to 90° with respect to each other and intersecting at a center of rotation of said coupling, said coupling comprising:
   means for transmitting rotation and torque between said shafts, said transmitting means comprising at least one annular flexible wall member having opposite end portions and a spherical region between said end portions and including first and second spherical segments extending from respective said end portions, said spherical region having a single center, said first spherical segment being turned back with respect to said second spherical segment and positioned radially inwardly thereof, with said first and second spherical segments being connected by an annular curved bend of the material of said flexible wall; and
   means for connecting said end portions of said flexible wall to respective said shafts such that said annular bend has, for a given axis extending perpendicular to said axis of rotation of at least one of said shafts and passing through said coupling center, a flexion axis about which said annular bend is movable with said flexion axis extending perpendicular to said given axis and said at least one axis of rotation and passing through said coupling center, and said annular curved bend having a flexion center which coincides with said coupling center.

2. A coupling as claimed in claim 1, wherein each said shaft has connected thereto a cup member having a spherical surface, each said end portion includes an annular end part having therethrough an opening, and said connecting means comprises means for fixing said end parts to said shafts with said openings coaxial with respective said shafts and with said spherical segments being guided by respective said spherical surfaces.

3. A coupling as claimed in claim 2, wherein said spherical segments define therebetween a volume filled with a lubricant.

4. A coupling as claimed in claim 2, wherein said fixing means comprise annular projections extending from said end parts and fitting into complementary shaped recesses in said cups.

5. A coupling as claimed in claim 4, wherein said fixing means further comprises washers coaxial with respective said shafts and maintained in bearing relation to respective said end parts by fixing elements.

6. A coupling as claimed in claim 5, wherein said fixing elements comprise screws threaded into respective said shafts.

7. A coupling as claimed in claim 1, comprising two said flexible walls positioned symmetrically relative to a median plane of said coupling passing through said coupling center, each said flexible wall including respective said first and second spherical segments connected by a said bend, and said flexion axes of said bends coinciding at said coupling center.

8. A coupling as claimed in claim 7, further comprising inner and outer rings connected to respective shafts, and said connecting means comprise means for fixing said opposite end portions of each said flexible wall to said inner and outer rings.

9. A coupling as claimed in claim 8, wherein said fixing means comprise annular projections extending from said end portions and fitting into complementary shafted recesses in said rings.

10. A coupling as claimed in claim 8, wherein said fixing means comprise end portions of said rings bent over onto said end portions of said flexible walls.

11. A coupling as claimed in claim 8, wherein said two flexible walls define therebetween a volume filled with a lubricant.

12. A universal coupling for transmitting rotation and torque between two shafts, each said shaft having an axis of rotation, with said axes being rotatable and having an angle of 0° to 90° with respect to each other and intersecting at a center of rotation of said coupling, said coupling comprising:
   means for transmitting rotation and torque between said shafts, said transmitting means comprising two annular flexible wall members positioned symmetrically relative to a median plane of said coupling passing through said coupling center, each of said flexible wall members having opposite end portions and a spherical region between said end portions and including first and second spherical segments extending from respective said end portions, each said spherical region having a single center, said first spherical segment of each of said flexible wall members being turned back with respect to said second spherical segment and positioned radially inwardly thereof, with said first and second spherical segments of each of said flexible wall members being connected by an annular curved bend of the material of said flexible wall;
   inner and outer rings connected to respective shafts;
   means for connecting said end portions of each of said flexible wall members to said inner and outer rings such that each said annular bend has, for a given axis extending perpendicular to said axis of rotation of at least one of said shafts and passing through said coupling center, a flexion axis about which said annular bend is movable with said flexion axis extending perpendicular to said given axis and said at least one axis of rotation and passing through said coupling center, each said annular curved bend having a flexion center which coincides with said coupling center, said connecting means comprising annular projections extending from said end portions and fitting into complementary annular recesses in said rings; and barrel-shaped rollers supporting each said bend and aligned to form a flexible annular collar radially guiding each said bend between said rings.

13. A universal coupling for transmitting rotation and torque between two shafts, each said shaft having an axis of rotation, with said axes being rotatable and having an angle of 0° to 90° with respect to each other and intersecting at a center of rotation of said coupling, said coupling comprising:

means for transmitting rotation and torque between said shafts, said transmitting means comprising two annular flexible wall members positioned symmetrically relative to a median plane of said coupling passing through said coupling center, each of said flexible wall members having opposite end portions and a spherical region between said end portions and including first and second spherical segments extending from respective said end portions, each said spherical region having a single center, said first spherical segment of each of said flexible wall members being turned back with respect to said second spherical segment and positioned radially inwardly thereof, with said first and second spherical segments of each of said flexible wall members being connected by an annular curved bend of the material of said flexible wall;

inner and outer rings connected to respective shafts;

means for connecting said end portions of each of said flexible wall members to said inner and outer rings such that each said annular bend has, for a given axis extending perpendicular to said axis of rotation of at least one of said shafts and passing through said coupling center, a flexion axis about which said annular bend is movable with said flexion axis extending perpendicular to said given axis and at least one axis of rotation and passing through said coupling center, each said annular curved bend having a flexion center which coincides with said coupling center, said connection means comprising annular projections extending from said end portions and fitting into complementary annular recesses in said rings;

barrel-shaped rollers supporting each said bend and aligned to form a flexible annular collar radially guiding each said bend between said rings; and a metal wire extending through and connecting said rollers of each said bend.

* * * * *